United States Patent Office 2,897,910
Patented Aug. 4, 1959

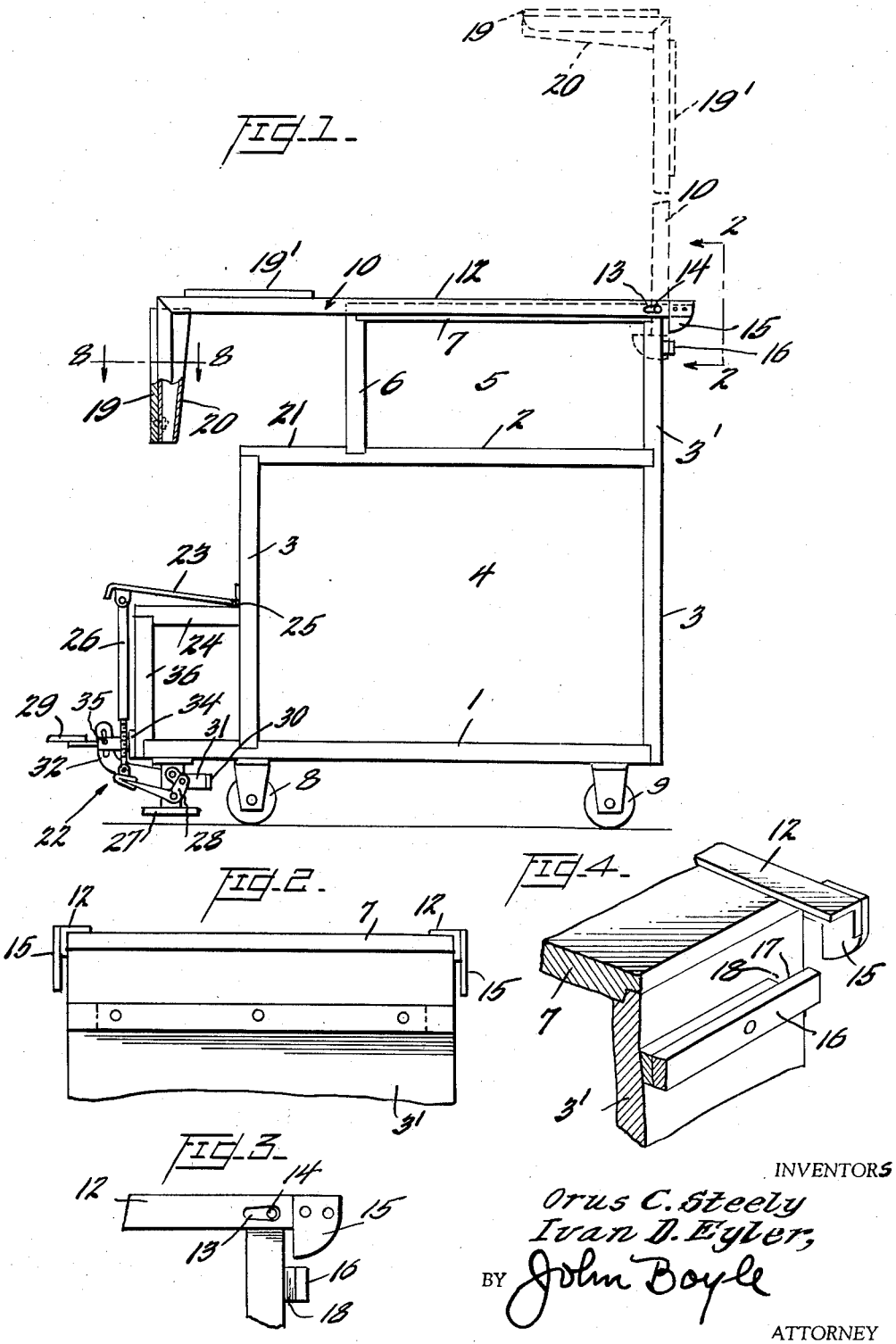

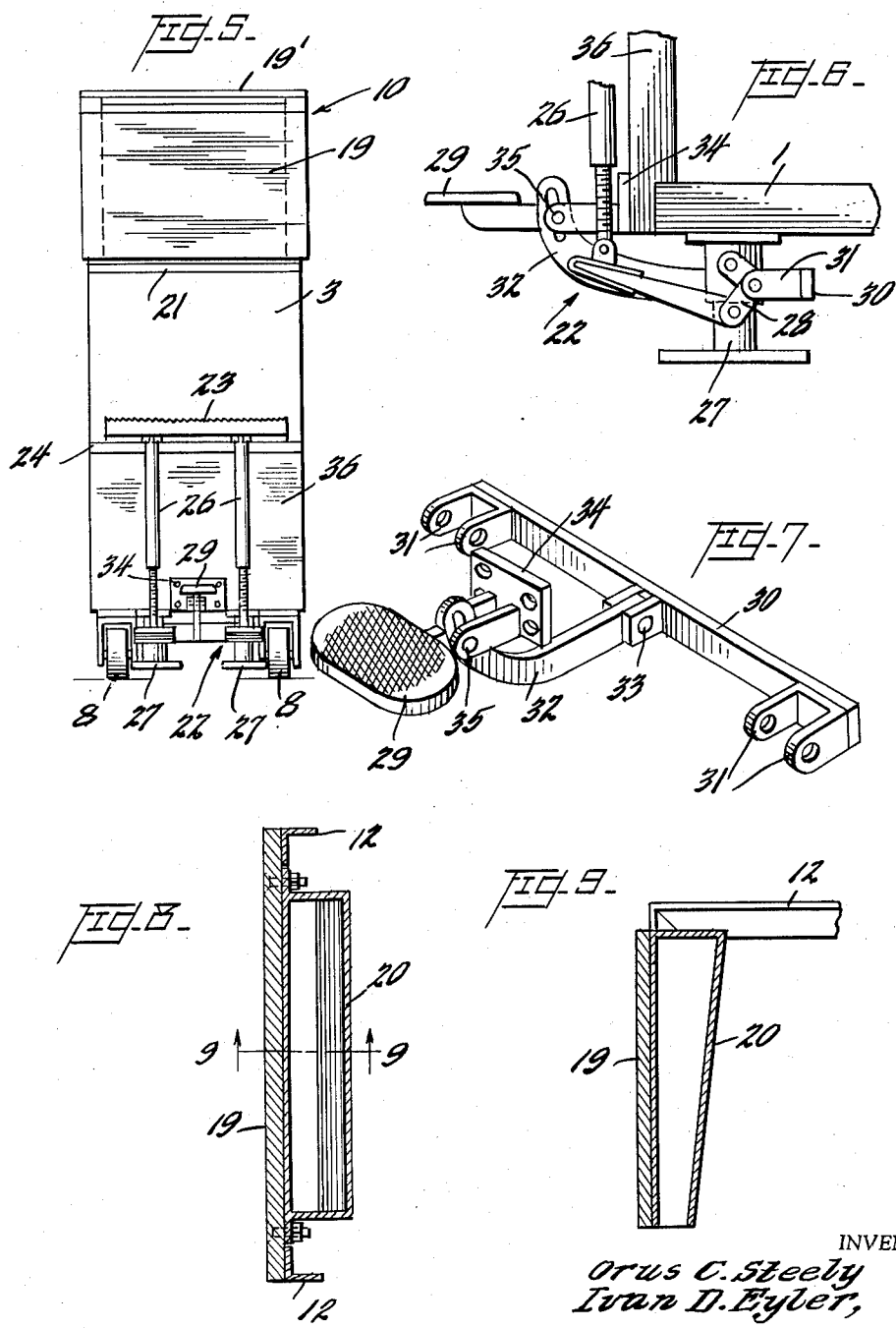

2,897,910

REFERENCE SERVICE CART

Orus C. Steely, Dallas, and Ivan D. Eyler,
Fort Worth, Tex.

Application March 18, 1955, Serial No. 495,367

6 Claims. (Cl. 182—15)

(Granted under Title 35, U.S. Code (1952), sec. 266)

The invention described herein may be manufactured and used by or for the Government of the United States for governmental purposes without the payment to us of any royalty thereon in accordance with the provisions of title 35, United States Code, section 266.

Our invention relates to a library and reference service cart having two or more shelves and is designed to be used in a similar manner as carts or trucks known in the trade as a "stock picker" or "ladder cart."

A primary object of the invention is to provide the cart with adequate climbing and carrying facilities. We also provide the cart with an automatic safety lock and a folding shelf available when working from the cart and that permits the operator to perform certain functions without the necessity of descending from the cart.

Experience has revealed a need for a library cart or truck with casters and material conveyance features and steps for use in retrieving items from vertical heights up to ten or more feet.

With these and other objects in view our invention consists of certain novel features of construction and mode of operation as will be more fully set forth in the following specifications and claims.

Reference is had to the drawings for a more complete disclosure in which:

Fig. 1 is a side elevation of the cart with a fragmentary section;

Fig. 2 is a fragmentary elevation in the direction of the line 2—2 of Fig. 1;

Fig. 3 is a detail view in side elevation of the shelf pivot and mounting;

Fig. 4 is a perspective fragmentary view of the shelf mounting and locking bar;

Fig. 5 is a view in elevation of the cart;

Fig. 6 is a detail side view in elevation of the automatic safety lock;

Fig. 7 is a detail perspective view of the lock releasing means;

Fig. 8 is a transverse section on the line 8—8 of Fig. 1; and

Fig. 9 is a vertical section on the line 9—9 of Fig. 8.

The body of the cart is provided with a horizontal shelf 1 and shelf 2 spaced therefrom and vertical sides 3 to provide a cabinet having a carrying space 4. Above the space 4 is another cabinet having a carrying space 5 formed by the shelf 2, the vertical portions 6 and 3' and an overlying top shelf 7.

The cart is supported by fixed casters 8 and horizontally swivelled casters 9. Pivoted to the upper end of the vertical portion 3' is a folding shelf frame 10, which when in horizontal position extends rearwardly of the vertical portion 6. With the shelf frame 10 in the horizontal position, it is at such a height that it can be used by the operator to push and steer the cart.

The side angle members 12 of the top frame 10 are provided with elongated slots 13 which engage pivot pins 14 carried by the vertical portion 3'. Also carried by the side members 12 are brackets 15, which engage the sides of the portion 3' when in upright position. Secured to the part 3' is a locking bar 16 which is offset at 17 to provide a space 18 so that when the shelf frame 10 reaches a vertical position, the ends of the side members 12 drop behind the bar 16 locking the top 10 in vertical position.

The ends of the top frame 10 are provided with a shelf 19 at right angles thereto and a shelf 19' parallel therewith. On the under side of the shelf 19 is a receptacle 20 that serves as a paper holder.

The shelf 19 is used as a work table when the frame 10 is in a vertical position and the shelf 19' serves as a work table when the frame 10 is in a horizontal position. The paper holder 20 is provided with a slanting bottom for the purpose of preventing material from dropping out when the shelf is raised to a vertical position.

For locking the cart in position when being used, we provide an automatic locking device 22 which can be activated or released separately and which does not interfere in any way with the conveying features of the cart. The locking device is used as the first step of the cart thereby insuring activation immediately upon use and not requiring forethought on the part of the operator. The height of the second step 21 prevents the operator from ascending to that step first, thereby insuring the use of the locking device 22 before mounting the cart.

To operate the lock 22, a metal plate 23 is located above the first step 24 and is attached to the cart by the hinge 25. The front of the plate 23 is attached to the floor lock by means of an adjustable link 26, pivoted thereto and to the locking device.

A standard floor locking device 22 forming no part of our invention and which may be purchased on the open market, is disclosed as suitable for our purpose. It consists of a foot 27 provided with a friction pad that engages the floor when the operator steps on the hinged step 23 depressing the link 26 which operates the toggle 28 and forces the foot 27 in contact with the floor and raises the casters 8 from off the floor.

In order to release the foot 27 from locking position, the operator steps on the release pedal 29. A bar 30 at each end 31 has the two locks 22 welded thereto. The pedal 29 has a slotted arm 32 secured to the bar 30 at 33. The bracket 34 carrying the pin 35 engaging the slotted riser arm 32 is secured to the riser 36 of the step 24. The bar 30 connects the breaking points of the floor lock toggles.

By stepping on pedal 29, the lock is tripped, thereby releasing it and lowering the raised casters 8 to the floor, placing them in position for rolling and conveying material.

The invention is particularly useful in warehouses, record depositories, libraries and various stock centers or locations where high shelving is used for purposes of conserving space. The device is more efficient than using ladders, since ladders provide only a means of ascending to the position where the material can be examined, removed or replaced. It is more efficient, convenient and safe than library type trucks for the reason that these trucks can be used only for conveying material and for safety reasons should not be used for other purposes. Our invention fills the need for both a ladder and a library cart or truck. By incorporating the folding shelf, the service cart provides a convenient apparatus that can be used in various ways without the necessity of descending. The provision of the step operated lock eliminates a definite safety hazard since the step cannot be used without automatically locking the cart in position and the cart remains anchored until the operator has completely descended from the cart and trips the lock by stepping on the release pedal.

What we claim as new and desire to secure by Letters Patent is as follows:

1. A cart provided with supporting wheels secured to the front and rear of the cart, a plurality of fixed steps at the rear end of the cart and integral therewith, a floor locking device carried by the rear end of the cart, means associated with the first step for depressing the locking device to engage the floor and raise the rear wheels from the floor as the operator mounts the first step, the cart then being supported at the rear in fixed locked position with the rear wheels off the floor, the rear end supported by the floor locking device and the front end supported by the front wheels thereby forming a non-skid stable foundation on the floor surface, and means for releasing the locking device after the operator has descended from the cart thereby returning to the floor the rear wheels and removing the locking device from engagement with the floor.

2. A reference service cart provided with a plurality of spaced superposed shelves including a top shelf, a plurality of steps at the rear of the cart leading to the top shelf, a shelf frame pivoted to the front upper portion of the cart and in one position extending rearwardly of and overlying the top shelf, means for supporting the shelf frame in horizontal and vertical positions, the shelf frame having a portion at its rear end serving as a work table for an operator when standing on the floor and the shelf frame is in a horizontal position, the shelf frame having at its rear end another adjacent portion serving as a work table when the operator is standing on the cart and the shelf frame is in a vertical position.

3. A reference service cart provided with a plurality of spaced superposed shelves including a top shelf, a plurality of steps at the rear of the cart leading to the top shelf, a shelf frame pivoted to the front upper portion of the cart and in one position extending rearwardly of and overlying the top shelf, means for supporting the shelf frame in horizontal and vertical positions, the shelf frame having a portion at its rear end serving as a work table for an operator when standing on the floor and the shelf frame is in a horizontal position, the shelf frame having at its rear end another adjacent portion serving as a work table when the operator is standing on the cart and the shelf frame is in a vertical position, wheels supporting the front and rear of the cart, the shelf frame extending rearwardly over the steps when in a horizontal position and at a height to serve as a handle for an operator for pushing and steering the cart.

4. The cart of claim 1 in which the means associated with the first step for depressing the locking device is a safety lock step located above the first step.

5. The reference service cart of claim 2 in which a paper receiving receptacle is located on the underside of the adjacent portion when the shelf-frame is in a vertical position.

6. A portable platform comprising a base, a first pair of wheels secured to the underside of said base at one end thereof, supporting legs positioned under said base at the opposite end thereof, a second pair of wheels positioned below said base adjacent said legs, said second pair of wheels and said first pair of wheels being adapted to support said base for movement on a supporting surface, means mounting said second pair of wheels and said legs in vertically adjustable relation to each other whereby said second pair of wheels can support said base in one position and said legs can support said base in another position, releasable means for elevating said base, said releasable means being adapted to maintain said base in elevated position until released, a plurality of spaced steps, means pivotally mounting the lowermost of said steps, said pivoted step being adapted to be moved downwardly in use, means associated with said pivoted step for releasing said releasable means whereby said legs are permitted to move into contact with the supporting surface restraining said base against movement thereon.

References Cited in the file of this patent

UNITED STATES PATENTS

| | | |
|---|---|---|
| 663,821 | De Vries | Dec. 11, 1900 |
| 1,063,620 | Thornley | June 3, 1913 |
| 1,439,388 | Willett | Dec. 19, 1922 |
| 2,236,281 | Anderson | Mar. 25, 1941 |
| 2,377,043 | Samuelson | May 29, 1945 |
| 2,541,270 | Mitnick | Feb. 13, 1951 |
| 2,630,961 | Burg | Mar. 10, 1953 |
| 2,707,585 | Hoey | May 3, 1955 |
| 2,798,652 | Easton | July 9, 1957 |